3,532,458
METHOD OF PREPARING CRYSTALLINE SODIUM METASILICATE

David B. Kirby, Midland, Mich., assignor to The Dow Chemical Company, Midland, Mich., a corporation of Delaware
No Drawing. Filed Sept. 29, 1967, Ser. No. 671,590
Int. Cl. C01b 33/32
U.S. Cl. 23—110      4 Claims

ABSTRACT OF THE DISCLOSURE

The present invention concerns an improved method of preparing anhydrous sodium metasilicate ($Na_2SiO_3$) which comprises reacting, usually under pressure, a fine, high $SiO_2$-containing sand in an excess of sodium hydroxide for a period less than about 60 minutes at elevated temperatures to precipitate an anhydrous metasilicate product which is characterized by a low insoluble impurity content well below about 0.24 percent and typically below about 0.04 to 0.06 percent.

---

While many processes have been developed and disclosed for the preparation of sodium metasilicate, these processes are either commercially not feasible, they produce excessive amounts of insoluble impurities, or they produce a hydrated material which is less economical to transport. Accordingly, there is need for a reasonably rapid process which will produce high purity anhydrous sodium metasilicate containing only a very minute insoluble impurity content by a method readily amenable to commercial production conditions and employing relatively inexpensive raw materials.

A primary object of the present invention is to provide an improvement in a method of producing anhydrous sodium metasilicate, the silicate product being characterized by a surprisingly low level of insoluble impurities of, for example, unreacted silica, sillimanite, montmorillonite, and the like. A related object is to provide such a sodium metasilicate product which is anhydrous and has an insoluble impurity level below about 0.04% to 0.06% and typically not exceeding about 0.1%.

The present invention comprises an improvement to a process for making sodium metasilicate, the process being improved upon being disclosed in U.S. Letters Patent 2,830,876 issued to Mockrin et al. The Mockrin process upon which is based the present improvement comprises first preparing a sodium silicate liquor in which the $Na_2O$-to-$SiO_2$ weight ratio is within the range of 1.6 to 3.0. So-prepared, the liquor is digested at a temperature of at least 140° C. and preferably from 160° to 200° C. Precipitation of crystals of anhydrous sodium metasilicate occurs during heating until the precipitation is substantially complete, which usually requires a heating time of at least about 20 minutes, but not generally requiring a period of over about 2 hours. After digestion, the solution is cooled to a temperature within a range of from about 70° C. to about 120° C., and preferably about 90° C. The starting sodium silicate solution may be obtained and prepared by digesting silica in aqueous caustic in proportions to provide the aforesaid ratios and to provide an aqueous reaction composition wherein the $Na_2O$, $SiO_2$ and water are present in the proportion of from 27.0 to 42.5% $Na_2O$, from 10 to 22% $SiO_2$ and water, by difference of from 43 to 60 percent. A minimum disclosed insoluble impurity concentration of from 0.24 to 0.44% is obtained in the Mockrin process as described. Now unexpectedly, the Mockrin process has been improved in accordance with the present invention to provide a superior sodium metasilicate product exhibiting surprisingly low insoluble impurity level.

Accordingly, the improvement of the present invention comprises: employing, in the Mockrin et al. process, sand of a predetermined purity and classification, the sand being characterized in that it comprises at least 99.8% of $SiO_2$ and preferably 99.9% $SiO_2$, and further characterized in that, prior to digestion with sodium hydroxide at least 80 weight percent thereof will be capable of passing a number —325 mesh screen (U.S. Standard sieve series), with preferably 94–95% being so-capable, the balance being capable of preferably passing a number —200 mesh screen.

The sodium hydroxide employed in the present novel process may be, e.g., as a 50 to 73 percent aqueous solution. In any event sufficient caustic must be employed to provide a $Na_2O$-to-$SiO_2$ weight ratio of from 1.6 to 3 and a reaction composition wherein the $Na_2O$ concentration is within a range of from about 27.0 to 42.5%, there being sufficient excess caustic in the solution to give a mother liquor with at least about 20% NaOH at the end of the reaction.

The anhydrous sodium metasilicate precipitate produced by the improvement of the present invention is generally of large crystalline size and fast settling such as to render separation from the mother liquor a relatively easy matter. Upon separation, such as, by filtration, the precipitate may be washed with a 28% $NH_3$ aqueous ammonia solution or, e.g., methanol, then dried at, 110° C. in an air atmosphere to an anhydrous free flowing powder having a high bulk density. An unusually high $CO_2$-containing atmosphere during drying tends to raise the insolubles impurity content and therefore should be avoided.

The term "insolubles" as used herein means and refers to an impurity appearing in the anhydrous metasilicate product and normally comprises one or more insoluble materials such as, e.g., unreacted silica, sillimanite, montmorillonite, complex silicates, and trace amounts of unidentified inorganic materials.

The following examples serve to illustrate various operable and preferred embodiments of the present invention and are not to be construed as limiting the invention thereto.

EXAMPLE I

A stirred pressure vessel was loaded with a slurry of 1000 grams of 50% aqueous sodium hydroxide and 267 grams of —325 mesh sand containing 99.9% by weight $SiO_2$. The vessel was sealed and heated to 200° C. within about one half hour and held at 200° C. for one-half hour during which time a solid of anhydrous sodium metasilicate was formed. The metasilicate was separated from its mother liquor as a wet cake then washed with 28% $NH_3$ to reduce the NaCl content followed by a methanol wash to reduce the water content, then dried at 110° C. A dry, stable, high purity sodium metasilicate product was obtained containing about 0.048% by weight insoluble impurity.

EXAMPLE II

A slurry of 1000 grams of 50% diaphragm cell caustic, saturated with NaCl, was added to 267 grams of Pennsylvania Pulverizing Supersil, —325 mesh sand. This was slurried in a Parr bomb with a mechanical agitator for 10 minutes. The bomb was closed and all valves sealed off. The bomb was put in the heater, whereupon, air and discharge lines were put in place. The agitator and heat were turned on and the run commenced. The reactor was heated to 200° C. whereupon the reaction mass exhibited an autogenous pressure of 238 p.s.i.g.; the temperature was maintained at this point for one hour during which the pressure rose to 258 p.s.i.g. The bomb was cooled quickly to 100° C. and the air line opened. The

3 discharge line was then opened and 100 p.s.i.g. air was blown into the bomb, forcing the product slurry out into the centrifuge. The centrifuge was turned at 3120 r.p.m. or 800 g's for 10 minutes and the mother liquor collected in a beaker.

The specific gravity of the "clears," i.e., centrifugate, was taken and found to be 1.378. The mother liquor was found to contain 0.978% NaCl, 20.0% $Na_2O$ and 7.35% $SiO_2$.

162 grams of the wet centrifuge cake was dried at 110° C. and found to weigh 126 gms. which represents a 22.2% moisture loss. The analysis on the cake gave 0.267% NaCl, 48.17% $Na_2O$, and 36.1% $SiO_2$. The insolubles content was 0.0592%; the product dissolved in water quite fast to give a clear solution.

158 grams of the wet centrifuge cake was washed with about two bed volumes each of 28% $NH_3$ solution and methanol. The weight was reduced to 152 gms. The product was dried at 110° C. and found to weigh 106 grams which represents a 32.9% moisture loss. The cake analysis gave 0.269% NaCl, 51.5% $Na_2O$, and 44.2% $SiO_2$, and insolubles of 0.017%. It provided a clear solution when dissolved in water.

EXAMPLE III

The general procedure of Example II was essentially repeated to prepare various samples of anhydrous sodium metasilicate using the improvement of the present invention. Other "comparative" samples were prepared and carried out with the benefit of the present improvements. The results of these sample runs together with the various conditions under which each was run, amounts of starting materials, analysis of the mother liquor as to percent $Na_2O$ and anhydrous metasilicate products are presented in the following table:

4

The foregoing examples of the present novel improvement show that when critical mesh size $SiO_2$-containing sand is employed to produce anhydrous sodium metasilicate in accordance with the present invention, an anhydrous sodium metasilicate product is obtained having a very low and high acceptable insolubles impurity content compared to that obtained from the Mockrin et al. process on which the present invention improves.

The present invention may be modified and changed without departing from the spirit or scope thereof and it is understood that the invention is only limited as defined in the appended claims.

I claim:

1. In a method of preparing anhydrous sodium metasilicate wherein silica sand is digested with aqueous sodium hydroxide in a reactor at a temperature of at least about 160° C., the sand and sodium hydroxide being in sufficient proportions to provide a mixture containing from about 27.0 to about 42.5% $Na_2O$, from about 10 to 22% $SiO_2$, and from about 43 to about 60% water and a $Na_2O$-to-$SiO_2$ weight ratio during reaction of from about 1.6 to about 3.0, thereby to precipitate anhydrous sodium metasilicate, the precipitate so-formed being separated from the reaction mixture and washed; the improvement comprising, digesting said sodium hydroxide with a silica sand which is characterized by a $SiO_2$ content of at least about 99.8 weight percent and a particle size wherein at least 80 percent of said sand particles are capable of passing −325 mesh sieve, the balance of said sand particles being capable of passing a −200 mesh sieve, whereby the anhydrous sodium metasilicate produced has a lower insoluble impurity level.

2. The improvement of claim 1 wherein at least 94 percent of said particles of said sand are capable of passing a −325 mesh sieve, the balance being capable of passing a −200 mesh sieve.

TABLE

| Sample | Feed in grams | | Percent Purity, Quartz Size | Reaction | | Pres- sure, p.s.i.g. | Weight of Dry cake | percent Insol | Mother Liq., percent $Na_2O$ | Dry Cake-after washing | | |
|---|---|---|---|---|---|---|---|---|---|---|---|---|
| | NaOH | Quartz | | Temp., °C. | Time, min. | | | | | percent NaCl | percent $Na_2O$ | percent $SiO_2$ |
| 1 | 500 | 267 | 99.9 percent minus 325 | 200 | 60 | 258 | 106 | 0.017 | 20.0 | .269 | 51.5 | 44.2 |
| Comparative (A) | 500 | 267 | 98.3—325 | 225 | 120 | 350 | 535 | .865 | 22.5 | .189 | 44.7 | 39.6 |
| Comparative (B) | 500 | 267 | 99.8—200 | 200 | 60 | 279 | 151 | .468 | 21.2 | None | 50.0 | 47.4 |
| 2 | 500 | 267 | 99.9—325 | 200 | 30 | 264 | 794 | .048 | 22.0 | 0.75 | 57.6 | 42.5 |
| 3 | 500 | 267 | 99.9—325 | 200 | 10 | 266 | 670 | 0.64 | 21.4 | .289 | 41.2 | 37.7 |

Sample 1 shows that by using a 99.9% $SiO_2$-containing sand of a fine mesh size (−325), a very low insolubles impurity is obtained in the anhydrous sodium metasilicate. Comparative sample (A) shows that when the same mesh size sand is used then the sand is only 98.3 $SiO_2$, even when reacted with NaOH at a much higher temperature and twice the reaction time, that a very high insolubles content results. Comparative Example (B) on the other hand shows a very high resulting insolubles content when the $SiO_2$ content of the sand is as high as 99.8% but where the sand mesh size is essentially only as fine as −200+325 mesh. Samples 2 and 3 show the low insolubles content which can be obtained when a −325 mesh 99.93% $SiO_2$ sand is employed in accordance with the present improvement, even at low reaction times of 10 minutes.

3. The improvement of claim 1 wherein digestion of said sand and sodium hydroxide is carried out at a temperature of from about 180° C. to about 200° C.

4. The improvement of claim 1 wherein digestion is carried out at a temperature of from about 180° C. to about 200° C. and at least 94 percent of the silica sand is capable of passing a −325 mesh sieve.

References Cited

UNITED STATES PATENTS 2,830,876  4/1958  Mockrin et al.  23—110.1
2,881,049  4/1959  Erbe et al.  23—110.1
3,271,317  9/1966  Otrhalek  23—110.1 X EDWARD STERN, Primary Examiner

PO-1050
(5/69)

UNITED STATES PATENT OFFICE
CERTIFICATE OF CORRECTION

Patent No. 3,532,458          Dated 6 October 1970

Inventor(s) David B. Kirby

It is certified that error appears in the above-identified patent and that said Letters Patent are hereby corrected as shown below:

In the Table in columns 3 and 4, under the column headed percent Insol delete "0.64" and add -- .064 --; under the column headed percent NaCl delete "0.75" and add -- .075 --.

Signed and sealed this 8th day of June 1971.

(SEAL)
Attest:

EDWARD M. FLETCHER, JR.
Attesting Officer

WILLIAM E. SCHUYLER, JR.
Commissioner of Patents